US009569769B2

(12) United States Patent
Smith et al.

(10) Patent No.: US 9,569,769 B2
(45) Date of Patent: Feb. 14, 2017

(54) COMPOSITE ACTIVATION INDICIA SUBSTRATE

(71) Applicant: e2interactive, Inc., Atlanta, GA (US)

(72) Inventors: Merrill Brooks Smith, Ft. Lauderdale, FL (US); Chandilyn Smith, Atlanta, GA (US)

(73) Assignee: e2interactive, Inc., Atlanta, GA (US)

( * ) Notice: Subject to any disclaimer, the term of this patent is extended or adjusted under 35 U.S.C. 154(b) by 463 days.

(21) Appl. No.: 13/621,333

(22) Filed: Sep. 17, 2012

(65) Prior Publication Data

US 2014/0076978 A1    Mar. 20, 2014

(51) Int. Cl.
| | | |
|---|---|---|
| B42D 15/04 | (2006.01) |
| B65D 73/00 | (2006.01) |
| G06Q 20/34 | (2012.01) |
| G06K 19/06 | (2006.01) |
| G06K 19/07 | (2006.01) |
| G06K 15/02 | (2006.01) |

(52) U.S. Cl.
CPC .......... *G06Q 20/354* (2013.01); *B42D 15/045* (2013.01); *B65D 73/0085* (2013.01); *G06K 15/02* (2013.01); *G06K 19/06037* (2013.01); *G06K 19/06196* (2013.01); *G06K 19/0723* (2013.01)

(58) Field of Classification Search
CPC ..... B42D 15/045; B42D 25/00; B42D 25/285; B42D 2033/16; B42D 2033/40; B42D 2035/16; G06K 19/005; G06K 19/08; G06K 19/10; G06K 19/14; B65D 73/00; B65D 73/0007; B65D 73/0028;B65D 73/0035; B65D 73/0078; B65D 73/0085; B65D 75/30; A45C 11/182; G06Q 20/354
USPC .............. 235/486, 487, 380; 705/35, 39, 41; 206/493–496, 39, 39.7, 39.8
See application file for complete search history.

(56) References Cited

U.S. PATENT DOCUMENTS

| | | |
|---|---|---|
| 3,553,440 A | 1/1971 | Dale |
| 5,281,799 A | 1/1994 | Mcintire et al. |
| 5,367,148 A | 11/1994 | Storch |
| 5,410,136 A | 4/1995 | Mcintire et al. |
| 5,414,252 A | 5/1995 | Shinoda |
| 5,427,832 A | 6/1995 | Longtin |
| 5,442,567 A | 8/1995 | Small |
| 5,457,307 A | 10/1995 | Dumont |
| 5,513,117 A | 4/1996 | Small |
| 5,602,377 A | 2/1997 | Beller |

(Continued)

*Primary Examiner* — Suezu Ellis
(74) *Attorney, Agent, or Firm* — Landmark Intellectual Property Law, PLLC

(57) ABSTRACT

The present invention is generally directed towards a card and package assembly and methods of making the same. Card and package assemblies in accordance with some embodiments of the present invention may include a package, a data card, the data card packaged at least in part within the package, and an activation indicia, the activation indicia comprising a first portion printed on the package and a second portion printed on the data card. Methods of packaging a data card in accordance with some embodiments of the present invention may include steps of manufacturing or otherwise obtaining a data card, manufacturing or otherwise obtaining a package, determining an activation indicia, packaging the data card at least in part within the package, and printing the activation indicia in part on the data card and in part on the package.

3 Claims, 11 Drawing Sheets

(56) References Cited

U.S. PATENT DOCUMENTS

| | | |
|---|---|---|
| 5,650,209 A | 7/1997 | Ramsburg et al. |
| 5,667,247 A | 9/1997 | Ramsburg et al. |
| 5,684,291 A | 11/1997 | Taskett |
| 5,720,158 A | 2/1998 | Goade, Sr. |
| 5,740,915 A | 4/1998 | Williams |
| 5,760,381 A | 6/1998 | Stich et al. |
| 5,777,305 A | 7/1998 | Smith et al. |
| 5,785,355 A | 7/1998 | Main |
| 5,895,073 A | 4/1999 | Moore |
| 5,907,142 A | 5/1999 | Kelsey |
| 5,918,909 A | 7/1999 | Fiala et al. |
| 5,958,174 A | 9/1999 | Ramsberg et al. |
| 5,987,132 A | 11/1999 | Rowney et al. |
| 6,129,275 A | 10/2000 | Urquhart et al. |
| 6,202,933 B1 | 3/2001 | Poore et al. |
| 6,224,108 B1 | 5/2001 | Klure |
| 6,270,012 B1 | 8/2001 | Dawson |
| 6,328,341 B2 | 12/2001 | Klure |
| 6,386,457 B1 | 5/2002 | Sorie |
| 6,439,613 B2 | 8/2002 | Klure |
| 6,542,933 B1 | 4/2003 | Durst |
| 6,543,809 B1 | 4/2003 | Kistner et al. |
| 6,550,685 B1 | 4/2003 | Kindberg |
| 6,554,187 B2 | 4/2003 | Otto |
| 6,575,361 B1 | 6/2003 | Graves et al. |
| 6,581,827 B2 | 6/2003 | Welton |
| 6,623,039 B2 | 9/2003 | Thompson et al. |
| 6,636,833 B1 | 10/2003 | Flitcroft |
| 6,697,812 B1 | 2/2004 | Martin |
| 6,715,795 B2 | 4/2004 | Klure |
| 6,829,596 B1 | 12/2004 | Frazee |
| 6,837,426 B2 | 1/2005 | Tidball et al. |
| 6,918,537 B2 | 7/2005 | Graves et al. |
| 7,063,255 B2 | 6/2006 | Algiene |
| 7,093,761 B2 | 8/2006 | Smith et al. |
| 7,118,478 B2 | 10/2006 | Fayter |
| 7,229,014 B1 | 6/2007 | Snyder |
| 7,243,839 B2 | 7/2007 | Beck et al. |
| 7,292,998 B2 | 11/2007 | Graves et al. |
| 7,328,190 B2 | 2/2008 | Smith et al. |
| 7,343,406 B1 | 3/2008 | Buonanno |
| 8,332,323 B2 | 12/2012 | Stals |
| 8,662,387 B1 | 3/2014 | Geller |
| 2003/0094494 A1 | 5/2003 | Blanford |
| 2003/0126079 A1 | 7/2003 | Roberson |
| 2004/0195341 A1 | 10/2004 | Lapstun |
| 2004/0224660 A1 | 11/2004 | Anderson |
| 2005/0017502 A1 | 1/2005 | Chariker |
| 2005/0027624 A1 | 2/2005 | Cai |
| 2005/0177517 A1 | 8/2005 | Leung |
| 2005/0279825 A1 | 12/2005 | Ashby et al. |
| 2006/0058011 A1 | 3/2006 | Vanska |
| 2006/0175401 A1 | 8/2006 | Roberts |
| 2006/0180661 A1 | 8/2006 | Grant |
| 2007/0021969 A1 | 1/2007 | Homeier-Beals |
| 2007/0045401 A1 | 3/2007 | Sturm |
| 2007/0063021 A1 | 3/2007 | Chakiris et al. |
| 2007/0063052 A1 | 3/2007 | Chakiris et al. |
| 2007/0114274 A1 | 5/2007 | Gibbs |
| 2007/0251995 A1* | 11/2007 | Kingsborough et al. ..... 235/380 |
| 2007/0257767 A1 | 11/2007 | Beeson |
| 2008/0070690 A1 | 3/2008 | Van Luchene |
| 2009/0006116 A1 | 1/2009 | Baker |
| 2009/0173782 A1 | 7/2009 | Muscato |
| 2009/0173784 A1 | 7/2009 | Yang |
| 2009/0240516 A1 | 9/2009 | Palestrant |
| 2010/0008535 A1 | 1/2010 | Abulafia |
| 2010/0042471 A1 | 2/2010 | Chang |
| 2010/0097180 A1 | 4/2010 | Cardullo |
| 2010/0237153 A1* | 9/2010 | Kingsborough et al. ..... 235/493 |
| 2011/0091092 A1 | 4/2011 | Nepomniachtchi |
| 2012/0099780 A1 | 4/2012 | Smith |
| 2012/0234911 A1 | 9/2012 | Yankovich |
| 2012/0284185 A1 | 11/2012 | Mettler |

\* cited by examiner

COMPOSITE ACTIVATION INDICIA SUBSTRATE

BACKGROUND OF THE INVENTION

The present invention is generally directed to systems and methods for reducing fraud associated with the theft and improper activation of data cards (such as, for example, gift cards or prepaid debit cards). Specifically, the present invention is directed to systems and methods for printing activation indicia on both a data card and a card package.

Data cards such as gift cards and telephone calling cards permit consumers to prepay for goods or services. An account associated with the data card is debited as goods and services are purchased using the card. Data cards typically include raised or protruding numbers which are a personal account number (PAN), and identify the account associated with the card. Data cards further typically contain a magnetic strip which contains all the data needed for commercial transactions: the PAN, the expiration date, and sometimes the name of the user. These magnetic strips must comply with commercial standards in order to be useful at most stores.

In many instances, the data cards are available for purchase directly from large retail displays. For security purposes, the data cards may be un-activated or have no value associated with them until a purchaser pays a retailer to activate the card or to associate a certain value with the card. Despite these security features to discourage theft, many criminals still steal the data cards, often by removing the card from its packaging.

These cards have been successful, in part, because they enable users to purchase goods and services in a manner that does not require cash on hand or establishing a pre-existing account. As such cards have increased in popularity, incidents of card misuse have increased as well. One method of misuse involves removing just enough of the scratch-off label to reveal the PIN, then covering the damaged area with an appropriately colored material or ink. With the PIN and control number in hand, the cards value can be extracted without actual physical possession of the card. An unsuspecting purchaser, without careful scrutiny, may buy the card only to discover that the security of the card has been breached. Alternatively, the retailer may observe the damage to the card. By the time the retailer or purchaser discovers the damage, however, the misuse will have likely occurred.

Additionally, criminals may attempt to steal information by copying the raised numbers that press through the package. Copying these raised numbers (possibly by etching) is a substantial first step towards penetrating the security procedures of the data card system. The criminal would then wait until the customer purchased and activated the card, and then attempt to obtain additional security information (such as a Personal Identification Number) from the customer through theft or trickery.

Accordingly, it may be desirable to provide a data card which is concealed within its packaging to discourage theft of the cards, and that can readily indicate whether a data card has been subject to misuse.

SUMMARY OF THE INVENTION

Aspects of the invention may comprise a card and package assembly, comprising: a package; a data card, the data card packaged at least in part within the package; and an activation indicia, the activation indicia comprising a first portion printed on the package and a second portion printed on the data card.

Aspects of the invention may further include a card and package assembly, comprising: a package, formed from a substrate and comprising an aperture therein; a data card, the data card packaged within the package and substantially aligned with the aperture such that at least a portion of the card is visible through the aperture; and an activation indicia, the activation indicia comprising a first portion printed on the package and a second portion printed on the data card, both the first portion and the second portion of the activation indicia being required in order to activate the card.

Aspects of the present invention may also include A method of packaging a data card, comprising manufacturing or otherwise obtaining a data card; manufacturing or otherwise obtaining a package; determining an activation indicia; packaging the data card at least in part within the package; and printing the activation indicia in part on the data card and in part on the package.

Additional aspects of the invention may include a method of packaging a data card in accordance with some embodiments of the present invention, comprising manufacturing or otherwise obtaining a data card; manufacturing or otherwise obtaining a package, the package comprising an aperture; determining an activation indicia, useable to activate the data card; packaging the data card within the package, substantially aligned with the aperture such that at least a portion of the card is visible through the aperture; and after the packaging step, printing the activation indicia in part on the data card and in part on the package.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWING

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1:
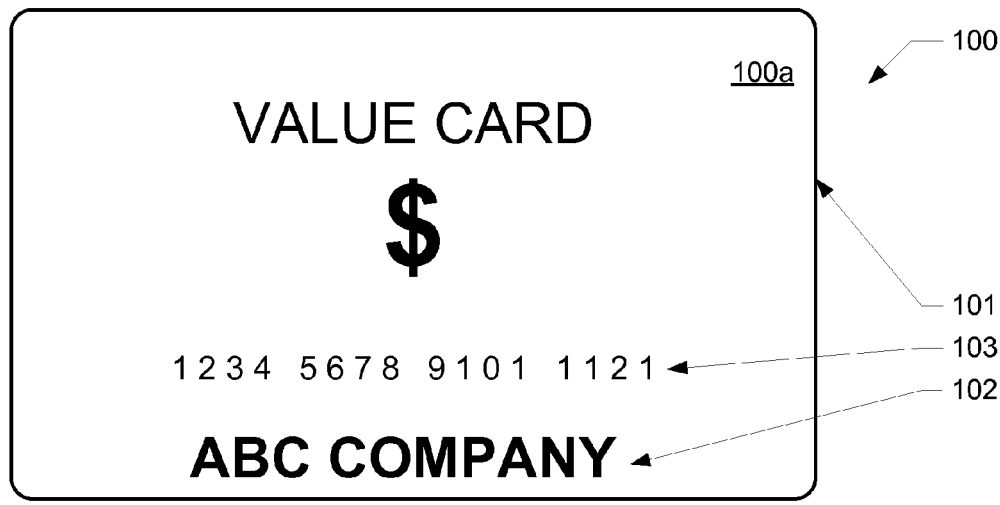
FIG. 1 illustrates the front side of a data card in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular. Reference figures preceded with "S" (e.g., S100) indicates a step.

FIG. 1 illustrates the front side of a data card in accordance with an exemplary embodiment. Data cards may comprise transaction cards such as gift cards, phone cards, and debit cards. This specification discloses exemplary embodiments through the example application of a data card. The security device disclosed herein, however, is not limited in its application to data cards and can be applied to any material placed over indicia requiring security so that when tampering occurs, visual indication of the tampering is evident.

With respect to a data card, the data card may comprise any physical shape and configuration, and also may comprise any type of material. In some exemplary embodiments, the data card may be configured in a manner similar to a standard credit or debit card, made of plastic and having the same or similar proportions and features. In some exemplary embodiments, the data card may be card-like, but have proportions different from a standard credit or debit card, for example, a keychain card, a folding paper card, a metal card, and so forth. In addition, the value card may be non-card-like, for example, a key fob, miniature figure, and/or a communication device, etc. In some exemplary embodiments, the data card may be available in multiple configurations allowing a user to select his or her desired configuration. For example, the data card may be available in a standard credit card-sized card and/or a smaller keychain card and/or a key fob.

In exemplary embodiments the data card may include electronic and or magnetic features, for example, a microprocessor, memory, an electronic chip, a magnetic strip, a Universal Serial Bus (USB) flash drive, a wireless communication device, etc. For example, a data card may have the same or similar features to a credit or debit card, such as having a magnetic strip located on the back of the card, and thus may be compatible with standard credit card readers. The data card may also be configured in a manner similar to a "smart card." Memory on the value card may be configured to store information related to a user, third party, processor, and/or past transactions, as well as other types of information related to the data card. In some exemplary embodiments, the value card may be configured to communicate with a wired device, such as by USB, coaxial cable, etc., and or a wireless device, such as by using Bluetooth and/or radio frequency identification (RFID) technology, etc.

The data card may have identification indicia, such as, by way of example, alpha characters, numeric characters, alphanumeric characters, images, embossed numbers, a coded magnetic strip, an embedded electronic chip, bar codes, and/or other such identification indicia as known in the art. In some exemplary embodiments, there may be unique identification indicia for each data card. Alternatively, some or all of the data cards may include the same identification indicia, or there may be a group of data cards with the same identification indicia within the group, but with a different indicia from other groups.

The identification indicia may be configured to associate the data card with a user, a third party, a processor, a retailer, and/or some other entity. The association may be accomplished by memory located remote of the data card or may be located on the data card itself. For example, information about the data card and/or the user may be stored in a remote database and/or may be embedded in a magnetic stripe on the data card. In addition, the data card may be associated with a particular third party using indicia that is visible on the data card, such as, by way of example, a biller-specific telephone number and/or trademark.

As seen in FIG. 1, a data card 100 includes a substrate 101 having a front side 100a upon which may be optionally printed identifying information 102, illustrated here, by way of example, as "ABC Company." The substrate 101 can be formed of cardboard, paper or plastic, and generally has the rectangular shape and size of a credit-card. Substrate 101, however, can be formed of any material capable of receiving a first indicia, such as, for example, an activation indicia, printed, deposited, or stored thereon and is unlimited as to shape and size. For example, the data card can be formed of a stainless steel substrate in the shape of a disc substantially the size of a U.S. silver dollar.

Figure 2:
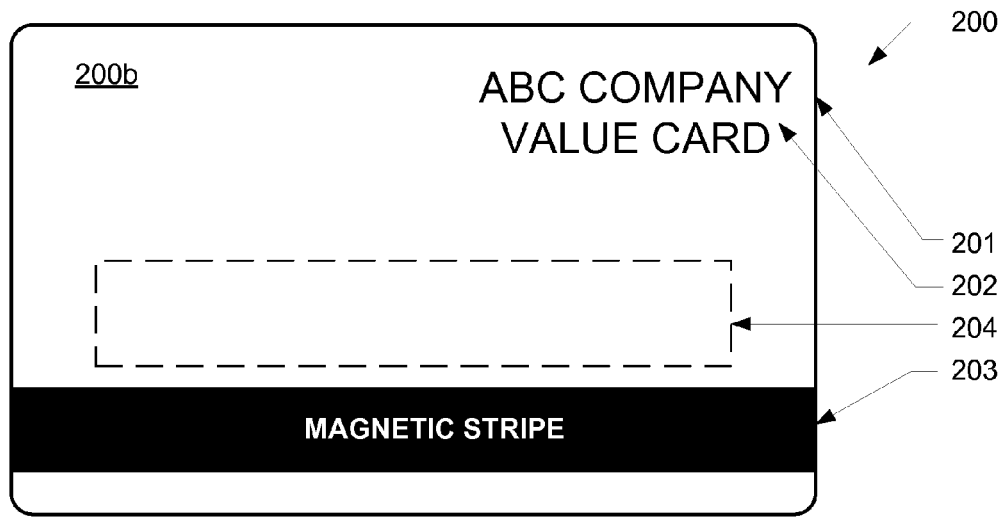
FIG. 2 illustrates the back side of a data card in accordance with some embodiments of the present invention.

With reference to FIG. 2, the back surface 200b of a data card 200—before being packaged within the package—will now be discussed. Data card 200 may comprise a substrate 201, upon which may be optionally printed identifying information 202, illustrated here, by way of example, "ABC Company Value Card." The substrate 201 may further comprise a magnetic stripe or other indicia 203 that may be used to redeem the data card for value, goods, or services. Note the empty or blank area 204 on the data card 200. In accordance with some embodiments of the present invention, this area 204 may align with an aperture or opening in the package, as discussed in more detail below.

Figure 3:
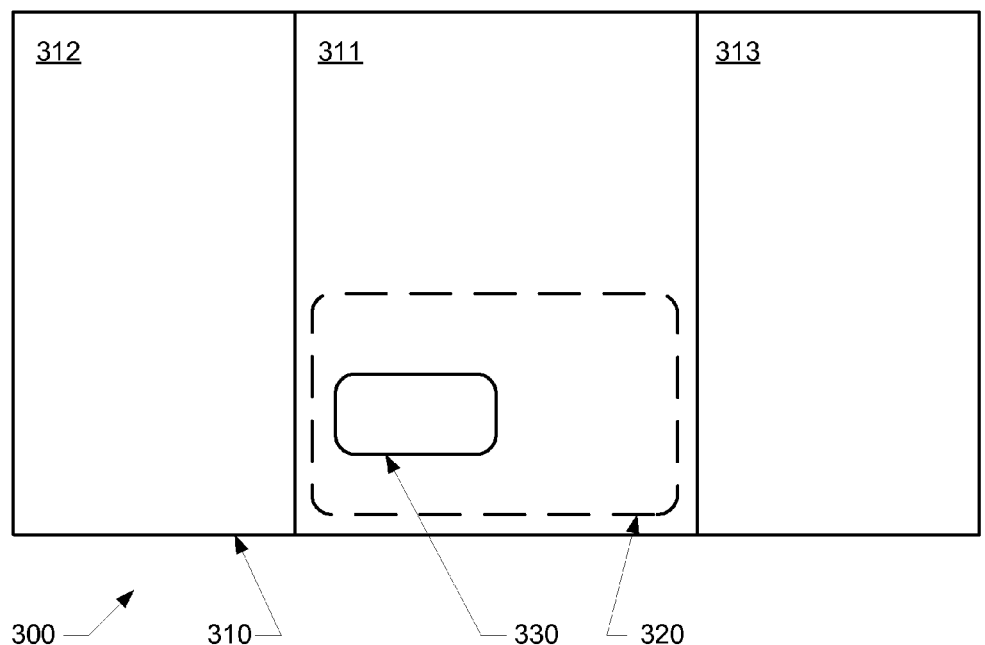
FIG. 3 illustrates a package in accordance with some embodiments of the present invention.

FIG. 3 illustrates a package 300 in accordance with some embodiments of the present invention. The package 300 may be comprised of a substrate consisting of a reasonable material, such as but not limited to paper, cardboard, plastic, composites, or any other material. The package 300 may be of any arrangement or design that may carry, encapsulate, or present a data card to a customer. As a non-limiting example, and with reference to FIG. 3, package 300 may be a tri-fold package comprising a center portion 311, a left portion 312, and a right portion 313. With such an arrangement, a data card may be placed (or adhered, if necessary) to the package, and the left and right portions 312, 313 may be folded around the card. The package 300 may further comprise an aperture 330 or other such opening, through which a portion of the card may be visible even after the data card is packaged within the package. During assembly, the card may be placed at approximately the location denoted at 320 in order to ensure proper alignment.

Figure 4:
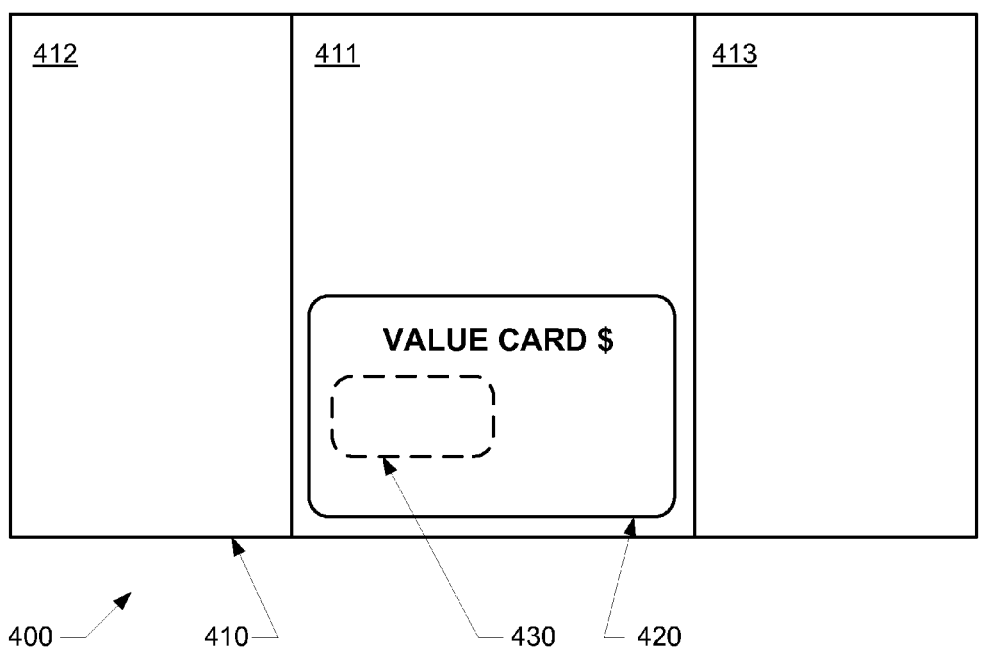
FIG. 4 illustrates a package and a data card in accordance with some embodiments of the present invention.
Figure 5:
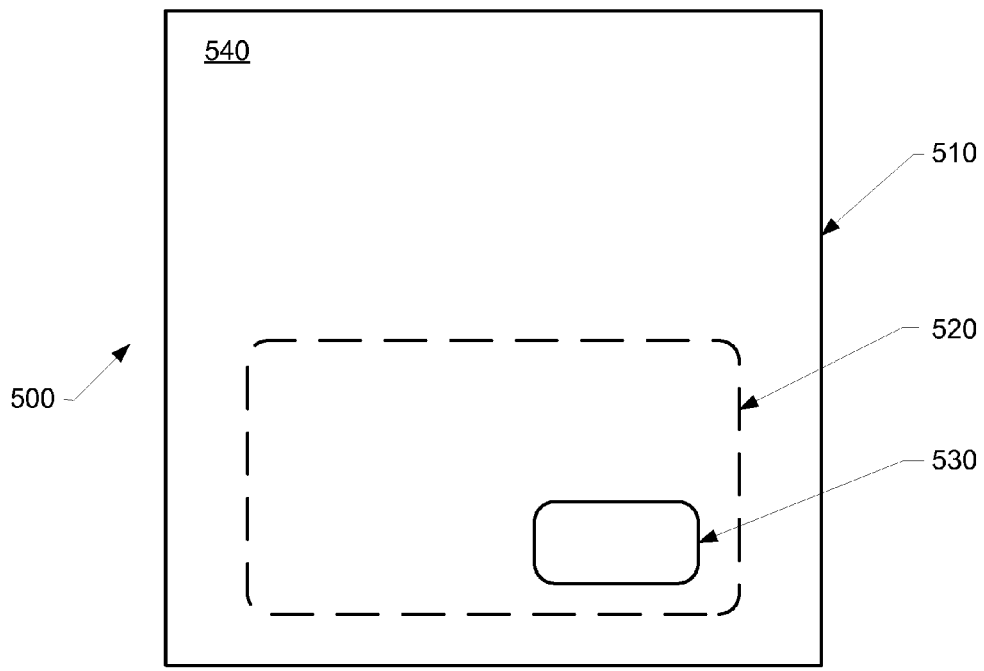
FIG. 5 illustrates a package and a data card in accordance with some embodiments of the present invention.

FIG. 4 illustrates a card and package assembly 400 in accordance with some embodiments of the present invention. The card and package assembly 400 may comprise a package 410 and a data card 420. The package 410 may comprise a center portion 411, a left portion 412, and a right portion 413, as well as an aperture 430. The card 420 may be adhered to the package 410 over the aperture 430.

Figure 6:
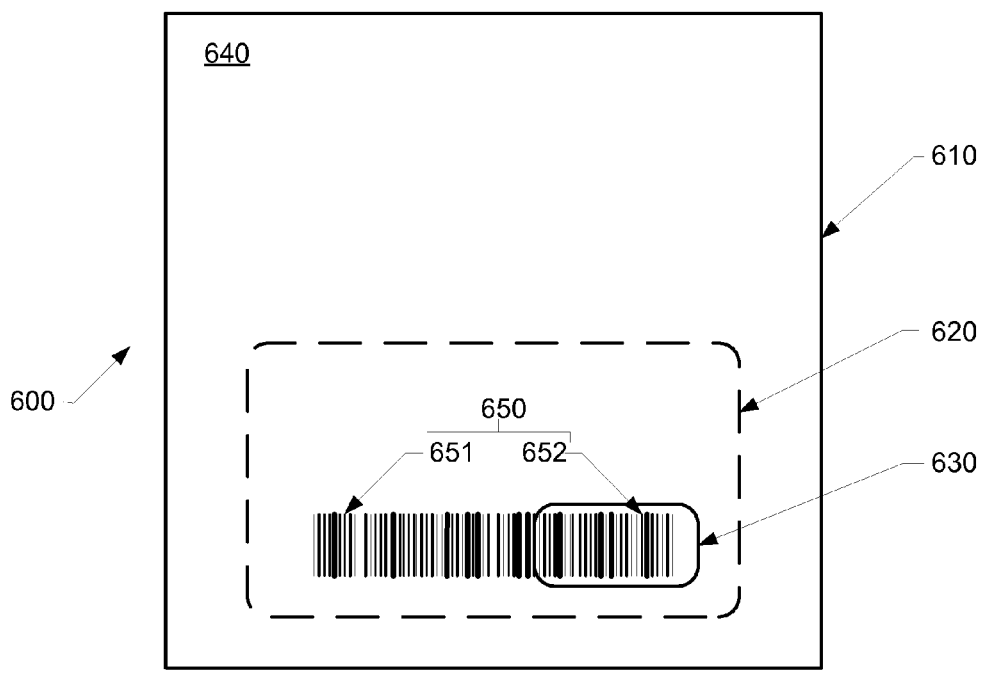
FIG. 6 illustrates a package and a data card in accordance with some embodiments of the present invention.

With reference to FIG. 6, a card and package assembly 600 will be discussed. The card and package assembly 600 may generally comprise a package 610 and a card 620 packaged therein. The package 610 may comprise an aperture 630 through which at least a portion of the card 620 may be seen and/or accessible. An activation indicia 650 may be printed, stored, encoded, or recorded on the package 610 and the card 620. The activation indicia 650 may comprise a first portion 651 printed on the package, and a second portion 652 printed on the data card. Both portions 651 and 652 may be required to activate the data card 620.

Figure 7:
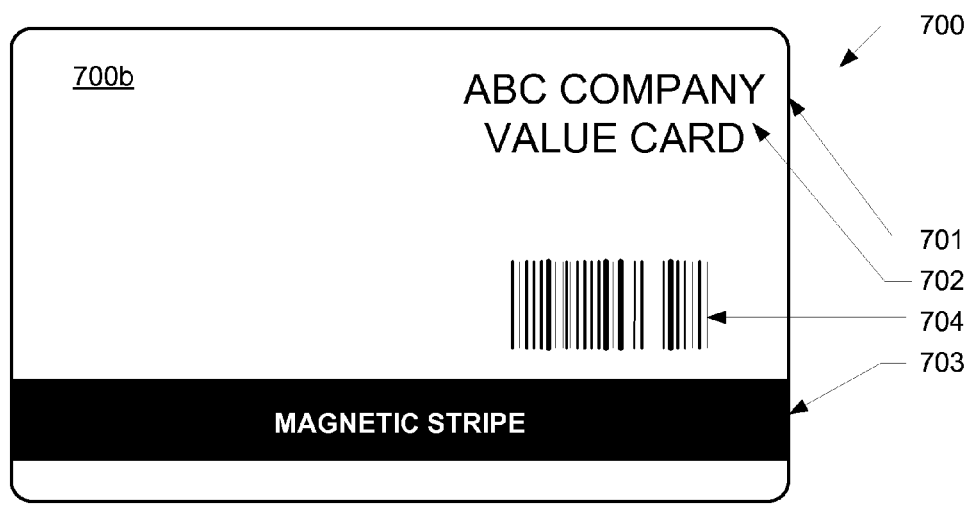
FIG. 7 illustrates a data card in accordance with some embodiments of the present invention.

With reference to FIG. 7, a data card 700 that was previously packaged in a package—and printed with an activation indicia—is illustrated. Data card 700 may be comprised of a substrate 701, with a back surface 700b. The back surface 700b may also comprise identifying information 702, for example "ABC Corp Value Card." The back surface 700b may also comprise account information that may be used when utilizing the card in a transaction—for example, a machine readable indicia 703 such as a magnetic stripe with account information encoded thereon. Note that it is contemplated that the machine readable indicia 703 may be on any surface of the card 700.

The card 700 may also include a portion of an activation indicia 704. The portion of the activation indicia 704 printed on the card may be insufficient, alone, to activate the card 700. Note that while it is depicted and discussed that activation indicia 704 may be printed on the back surface 700b of the card 700, it is contemplated that the activation indicia 704 may be on any surface of the card 700.

Figure 8A:
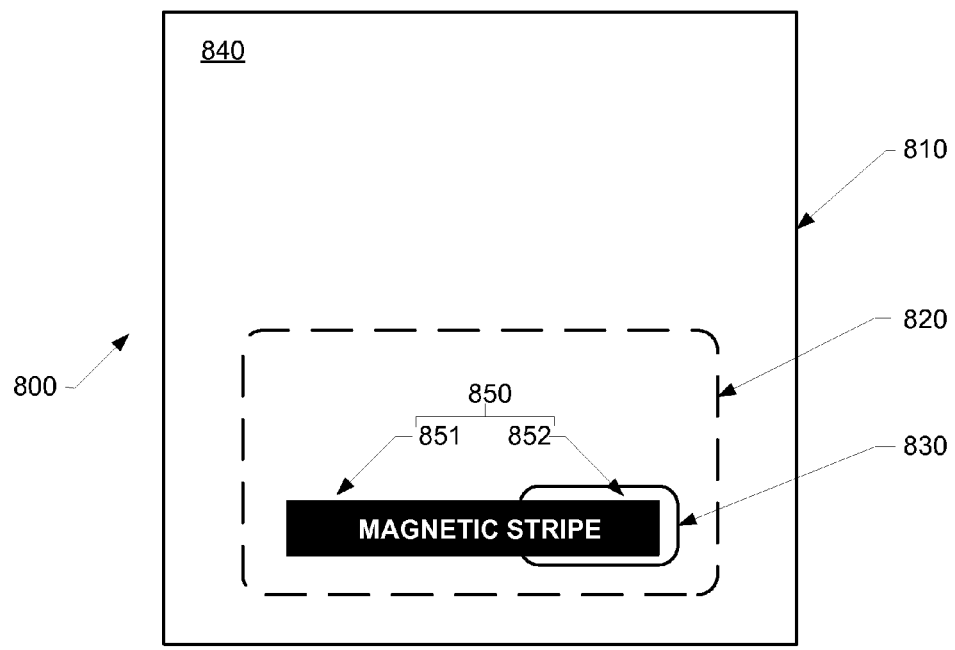
FIG. 8A illustrates a data card and package in accordance with some embodiments of the present invention.
Figure 8B:
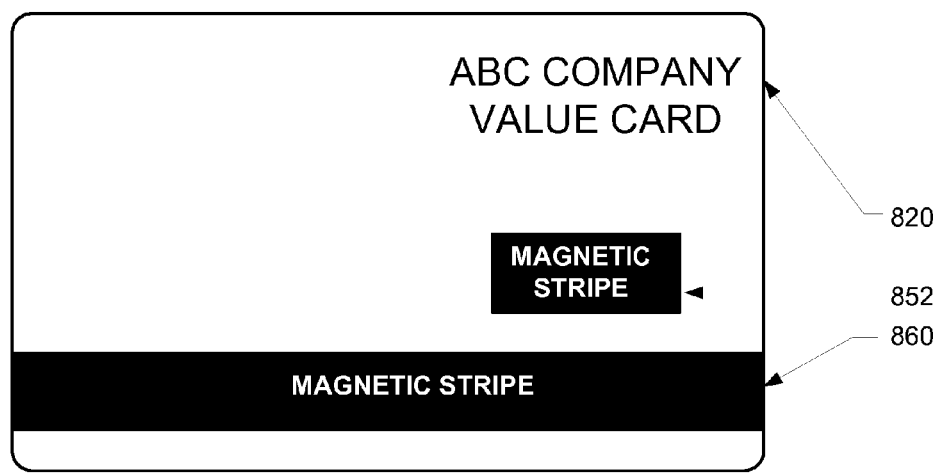
FIG. 8B illustrates a data card in accordance with some embodiments of the present invention.

With reference to FIG. 8A and FIG. 8B, a package and card assembly 800 will now be discussed. The package and card assembly 800 may comprise a package 810 and a card 820. Package 810 may comprise an aperture or opening 830 disposed on the back surface 840 of the package 810. The package 810 may also comprise an activation indicia 850 printed on the package and card assembly 800. The activation indicia 850 may be, for example, a magnetic stripe. Activation indicia 850 may comprise a portion printed on the package 851 and a portion printed on the card 852. The activation indicia 850 may be printed on both the card 820 and the package 810 after the card is packaged within the package. This can be seen, for example, on the card 820 shown in FIG. 8B by the portion of the activation indicia 852 printed on the card.

As noted above, the activation indicia may be any indicia sufficient to activate the card and any associated account. It was discussed above as a bar code and a magnetic stripe. It is also contemplated that the activation indicia may comprise other types of indicia, such as a QR code or other such graphical representation, an alpha, numeric, or alphanumeric code, or any other type of identifier. For example, the activation indicia may be a digital tag that may be capable of communicating with another unit. For example, the activation indicia may be stored in a radio frequency identification (RFID) tag.

Figure 9A:
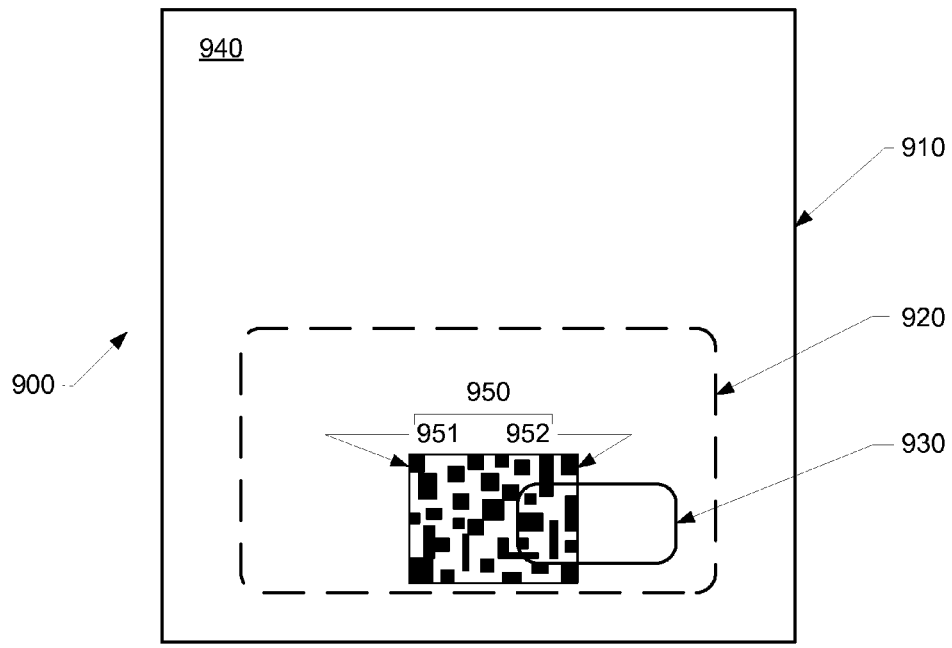
FIG. 9A illustrates a data card and package in accordance with some embodiments of the present invention.
Figure 9B:
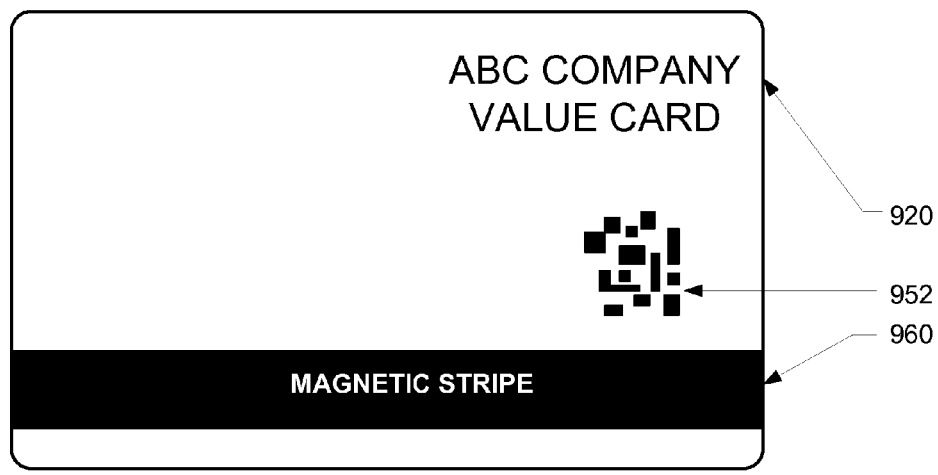
FIG. 9B illustrates a data card in accordance with some embodiments of the present invention.

FIGS. 9A and 9B illustrate a card and package assembly 900 that comprises a package 910 and a card 920. The package 910 may further comprise an aperture or opening 930, which may be disposed on a back surface 940 of the package 910. There may also be an activation indicia 850 printed on both the package 910 and the card 920. With reference to FIG. 9A, the activation indicia 850 may be a QR code, with a portion printed on the package 851 and a portion printed on the card 852.

Figure 10A:
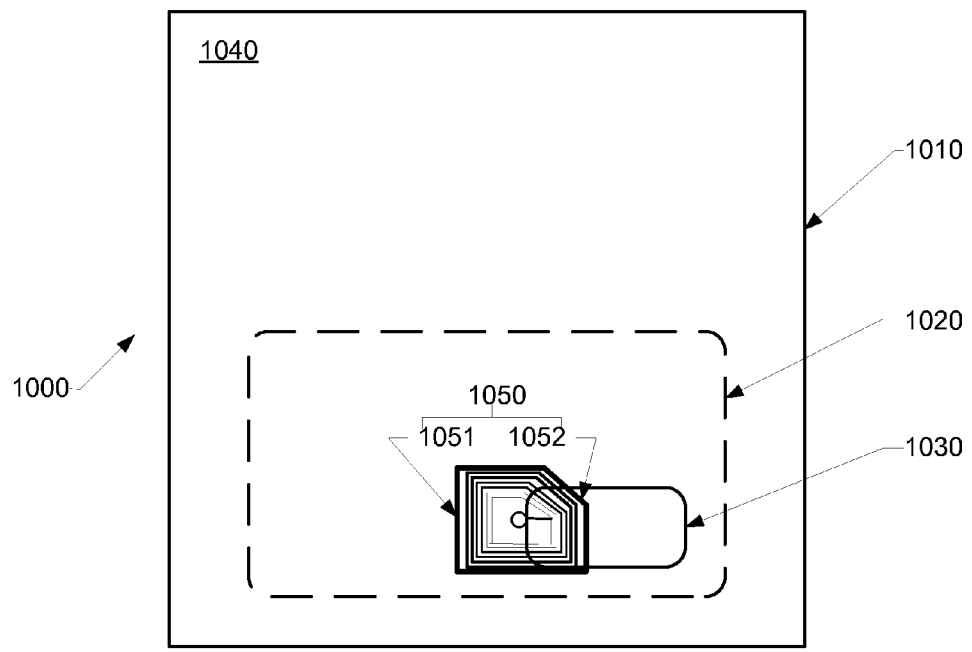
FIG. 10A illustrates a data card and package in accordance with some embodiments of the present invention.
Figure 10B:
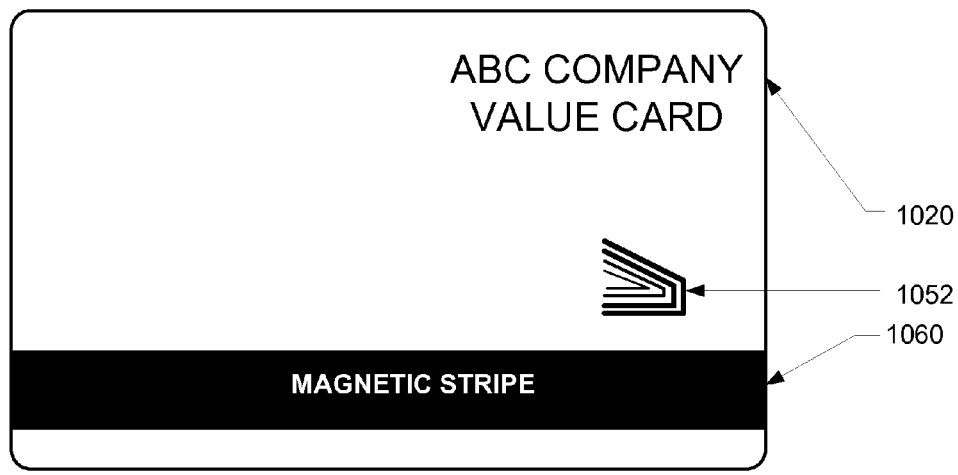
FIG. 10B illustrates a data card in accordance with some embodiments of the present invention.

FIGS. 10A and 10B also illustrate a card and package assembly 1000 that may comprise a package 1010 and a card 1020. The package 1010 may further comprise an aperture or opening 1030, which may be disposed on a back surface 1040 of the package 1010. The card and package assembly 1000 may further comprise an activation indicia 1050 printed on both the package 1010 and the card 1020. With reference to FIG. 10A, the activation indicia 1050 may be, for example, a passive RFID tag 1050. The RFID tag 1050 may be printed on both the package 1010 and the card 1020, with a portion 1051 printed on the package 1010, and a portion 1052 printed on the card 1020.

While it has been discussed above that the card may be visible through an aperture in the package, it is contemplated that the aperture may be a cut-away from the package, or that the card may protrude from package.

Figure 11:
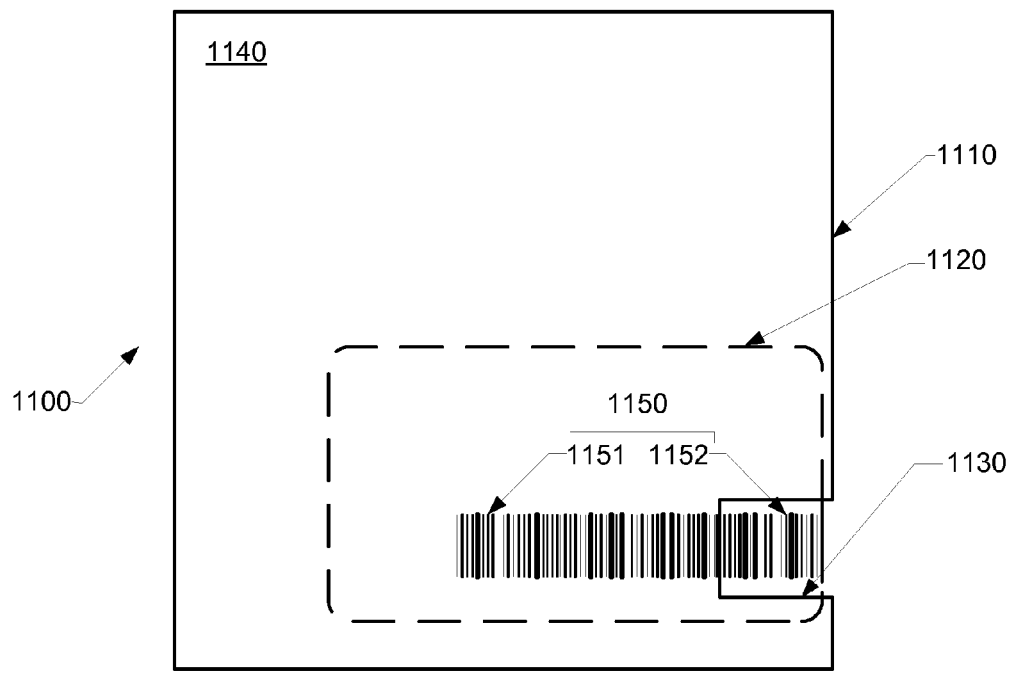
FIG. 11 illustrates a data card and package in accordance with some embodiments of the present invention.

With reference to FIG. 11, a card and package assembly 1100 will now be discussed. The card and package assembly 100 may comprise a package 1110 and a card 1120. The package 1110 may comprise a cut-away 1130 in a back surface 1140 of the package 1110. The card and package assembly 1100 may further comprise an activation indicia 1150 printed on both the package 1110 and the card 1120. The activation indicia 1150 may comprise a portion 1151 printed on the package and a portion 1152 printed on the card.

Figure 12:
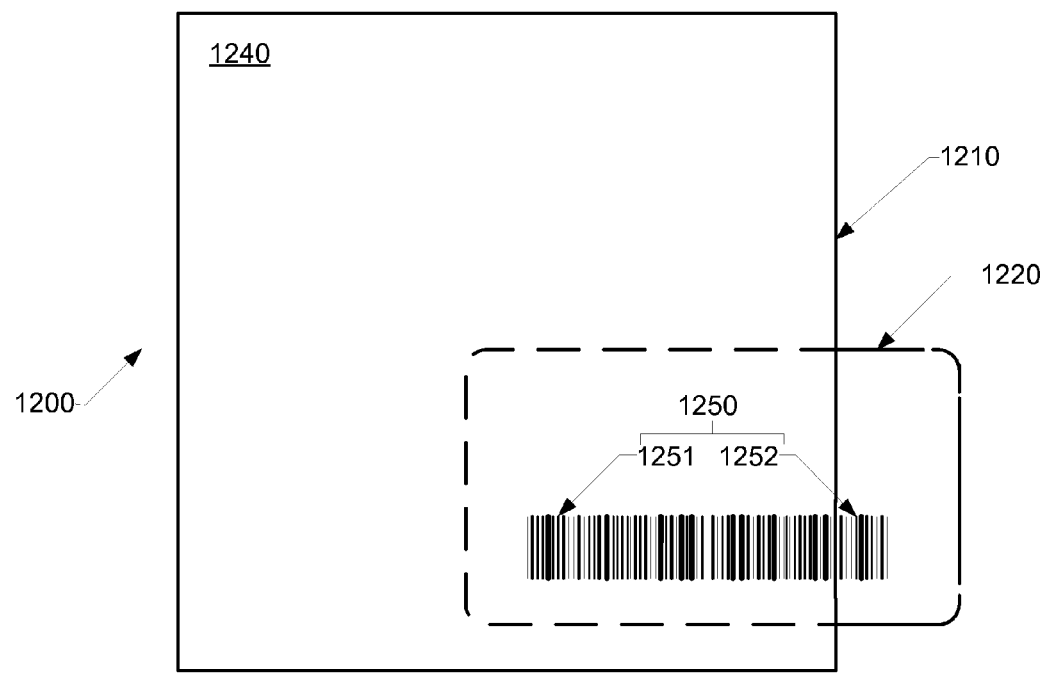
FIG. 12 illustrates a data card and package in accordance with some embodiments of the present invention.

With reference to FIG. 12, a card and package assembly 1200 will now be discussed. The card and package assembly 1200 may comprise a package 1210 and a card 1220. The card 1220 may be partially packaged within the package 1210, and may protrude from the package 1210 at least in part. The card and package assembly 1200 may comprise an activation indicia 1250 printed on both the card 1220 and the package 1210. The activation indicia 1250 may comprise a portion 1251 printed on the package 1210 and a portion 1252 printed on the card 1220.

Figure 13:
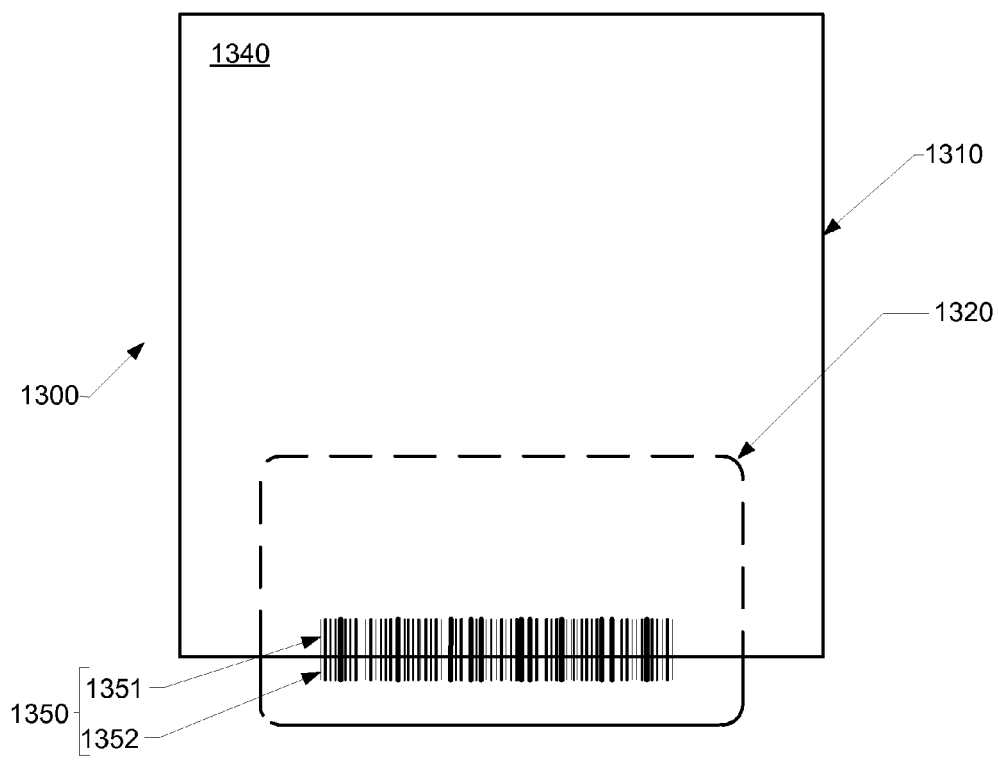
FIG. 13 illustrates a data card and package in accordance with some embodiments of the present invention.

With reference to FIG. 13, a card may protrude from the package in a different arrangement. FIG. 13 depicts a card and package assembly 1300 comprising a package 1310 and a card 1320. The card 1320 may be partially packaged within the package 1310, leaving a portion of the card 1320 protruding from the package 1310. The card and package assembly 1300 may further comprise an activation indicia 1350 printed on both the package 1310 and the card 1320. The activation indicia 1350 may comprise a portion 1351 printed on package 1310 and a portion 1352 printed on the card 1320.

Figure 14:
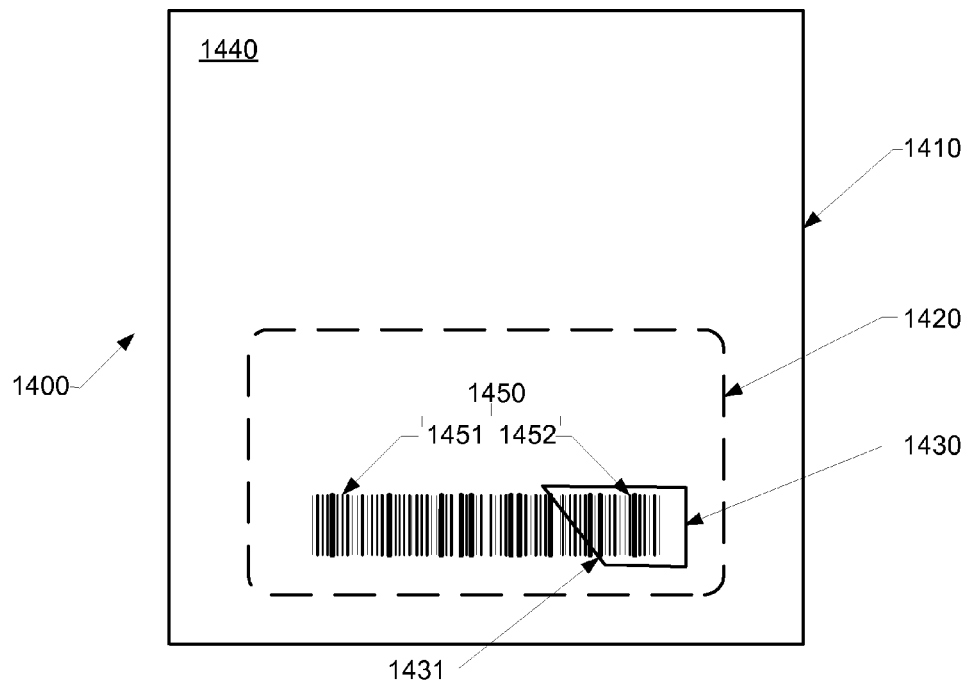
FIG. 14 illustrates a package and a data card in accordance with some embodiments of the present invention.
Figure 15:
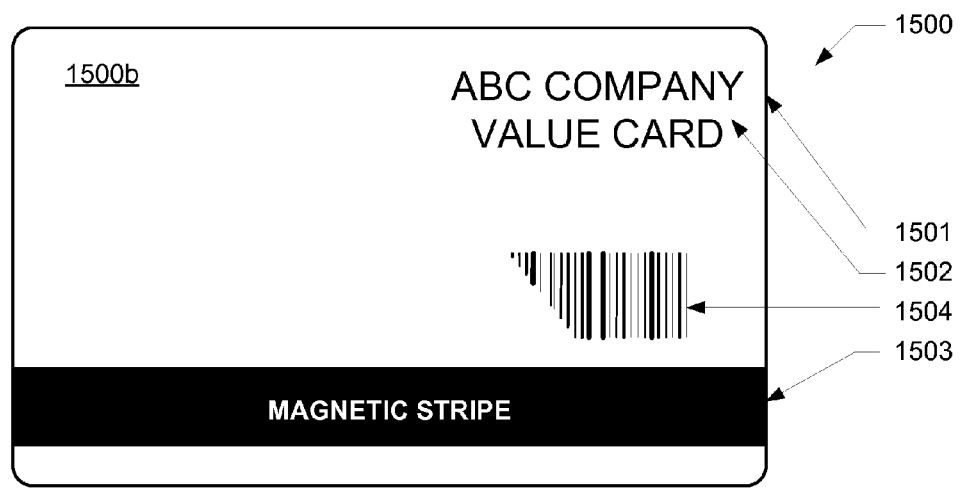
FIG. 15 illustrates a data card in accordance with some embodiments of the present invention.

With reference to FIGS. 14 and 15, variations cards and packaging in accordance with some embodiments of the present invention will now be discussed. With reference to FIG. 14, a card and package assembly 1400 will be discussed. The card and package assembly 1400 may generally comprise a package 1410 and a card 1420 packaged therein. The package 1410 may comprise an aperture 1430 through which at least a portion of the card 1420 may be seen and/or accessible. An activation indicia 1450 may be printed, stored, encoded, or recorded on the package 1410 and the card 1420. The activation indicia 1450 may comprise a first portion 1451 printed on the package, and a second portion 1452 printed on the data card. Both portions 1451 and 1452 may be required to activate the data card 1420.

Note that aperture 1430 may comprise an angled border, 1431, which may extend in an angle across the activation indicia 1450. In this manner, the interface between the card 1420 and the package 1410 is not parallel to the bar code depicted as the activation indicia 1450. Accordingly, any gaps, shadows, or other detection of the interface will now be construed by a bar code reader as an element of the activation indicia 1450 itself.

With reference to FIG. 15, a data card 1500 that was previously packaged in a package—and printed with an activation indicia—is illustrated. Data card 1500 may be comprised of a substrate 1501, with a back surface 1500b. The back surface 1500b may also comprise identifying information 1502, for example "ABC Corp Value Card." The back surface 1500b may also comprise account information that may be used when utilizing the card in a transaction—for example, a machine readable indicia 1503 such as a magnetic stripe with account information encoded thereon. Note that it is contemplated that the machine readable indicia 1503 may be on any surface of the card 1500.

The card 1500 may also include a portion of an activation indicia 1504. The portion of the activation indicia 1504 printed on the card may be insufficient, alone, to activate the card 1500. Note that while it is depicted and discussed that activation indicia 1504 may be printed on the back surface 1500b of the card 1500, it is contemplated that the activation indicia 1504 may be on any surface of the card 1500.

Figure 16:
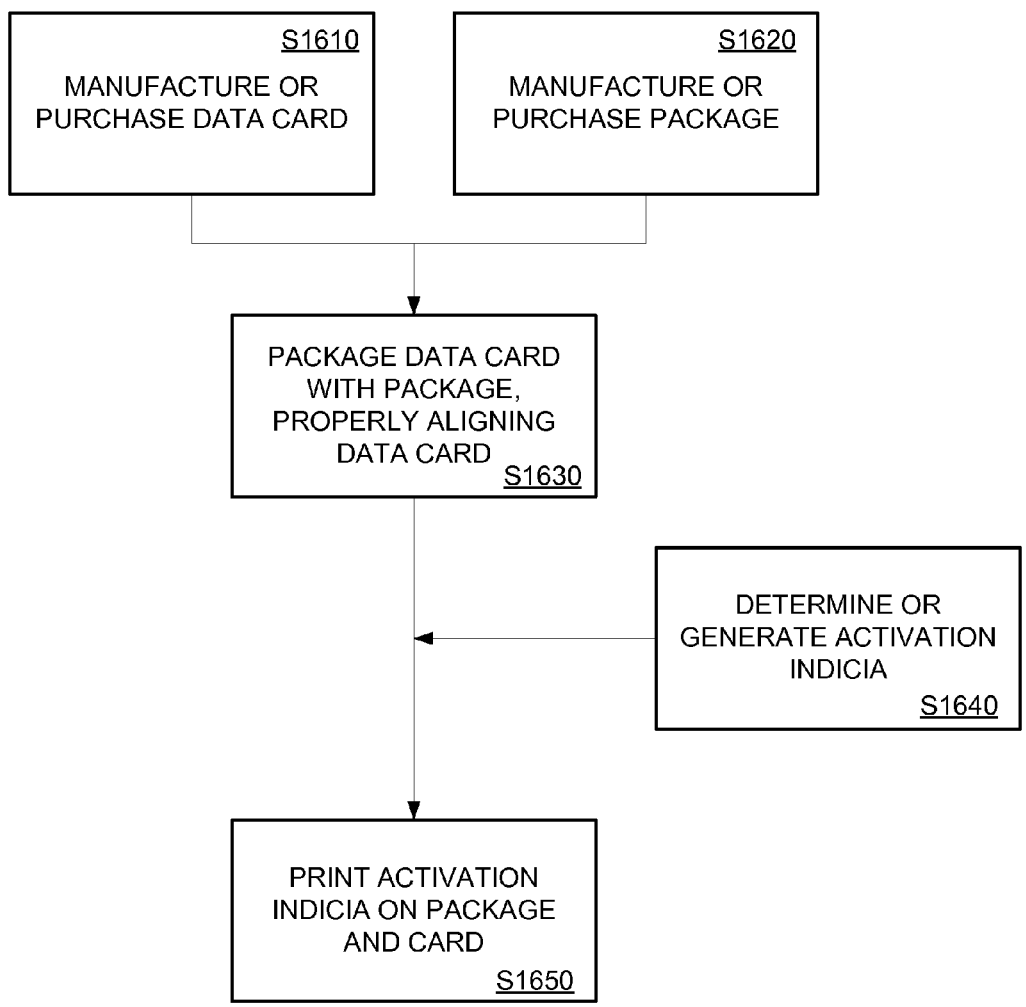
FIG. 16 illustrates a method of printing an activation indicia on a data card and package in accordance with some embodiments of the present invention.

With reference to FIG. 16, a method of packaging a card within a package and printing an activation indicia on both the card and the package will now be discussed. At step 1610, data cards may be manufactured or purchased. Similarly, at step 1620 card packages may be manufactured or purchased. The data card may then be packaged within the package at step 1630. Note—with reference to FIGS. 11 to 13—that it is not required that the data card be fully encapsulated by the package, but rather must be attached to the package. In such an arrangement, step 1610 and step 1620 may be combined into a single step.

Note that in order to secure the card in the package, various mechanisms may be utilized. For example, the card may be glued to the package or otherwise attached to the package—for example through the use of an interference fit.

At step 1640, an activation indicia that may be used to activate the card or an account associated therewith may be determined. The activation indicia may be generated or created during the process, or may be selected from a list of previously generated or created activation indicia.

At step 1650, the activation information may be printed on the card and package assembly. The activation information may be printed in part on the package and in part on the card. In order to activate the card or an associated account, the portions of the activation indicia printed on both the package and the card may be required.

It will be understood that the specific embodiments of the present invention shown and described herein are exemplary only. Numerous variations, changes, substitutions and equivalents will now occur to those skilled in the art without departing from the spirit and scope of the invention. For example, the specification above discusses a card that may be separate and distinct from the package. However, it is contemplated that the card may also be a part of the package—formed integrally with the package. For example, the package may comprise a cardboard material, and a portion of the package may be scored for a tear away card. Such an arrangement is depicted in U.S. Patent Application Publication No. 2007/0063021, which is incorporated herein by reference in its entirety.

Accordingly, it is intended that all subject matter described herein and shown in the accompanying drawings be regarded as illustrative only, and not in a limiting sense, and that the scope of the invention will be solely determined by the appended claims.

What is claimed is:

1. A card and package assembly, comprising:
   a package, formed from a substrate and comprising an aperture therein;
   a data card, the data card packaged within the package and substantially aligned with the aperture such that at least a portion of the card is visible through the aperture; and
   an activation indicia, the activation indicia comprising a first portion printed on a portion of the package within which the data card is disposed and a second portion printed on the portion of the data card visible through the aperture, both the first portion and the second portion of the activation indicia being required in order to activate the card.

2. A method of packaging a data card, comprising:
   manufacturing or obtaining a data card;
   manufacturing or obtaining a package, the package comprising an aperture;
   determining an activation indicia, useable to activate the data card;
   packaging the data card within the package, substantially aligned with the aperture such that at least a portion of the card is visible through the aperture;
   after the packaging step, printing the activation indicia in part on the portion of the card visible through the aperture and in part on a portion of the package in which the data card is disposed.

3. The method of packaging a data card of claim 2, wherein the step of printing the activation indicia comprises printing the activation indicia on the data card and in the package in a single process such that the activation indicia extends uninterrupted across data card and the package.

* * * * *